United States Patent
Brittingham

(10) Patent No.: US 10,429,884 B1
(45) Date of Patent: Oct. 1, 2019

(54) ADJUSTABLE MONITOR FRAME FOR RETAINING AND DISPLAYING A BOOK AND THIN PLANAR OBJECTS

(71) Applicant: David W. Brittingham, Delmar, DE (US)

(72) Inventor: David W. Brittingham, Delmar, DE (US)

( * ) Notice: Subject to any disclaimer, the term of this patent is extended or adjusted under 35 U.S.C. 154(b) by 0 days.

(21) Appl. No.: 15/842,237

(22) Filed: Dec. 14, 2017

(51) Int. Cl.
*G06F 1/16* (2006.01)

(52) U.S. Cl.
CPC .... *G06F 1/1611* (2013.01); *A47B 2200/0094* (2013.01); *G06F 2200/1613* (2013.01)

(58) Field of Classification Search
CPC .............. A47B 23/02; A47B 23/043; A47B 2200/0094; A47B 19/06; G06F 200/1613; G06F 1/1611
USPC .......... 248/442.2, 448, 449, 450, 118.5, 447, 248/447.2, 918, 924, 441.1, 200.1, 670; 361/679.25, 679.05; 40/341; 400/718
See application file for complete search history.

(56) References Cited

U.S. PATENT DOCUMENTS

| | | | | |
|---|---|---|---|---|
| 64,148 A * | 4/1867 | Rizy | ..................... | A47B 23/042 248/448 |
| 1,374,070 A * | 4/1921 | Elledge | .................. | A47B 23/02 248/447.2 |
| 1,699,176 A * | 1/1929 | Zaremba | .............. | A47B 23/007 248/448 |
| 2,747,322 A * | 5/1956 | Egghen | ............... | A24F 19/0071 248/447.2 |
| 3,939,986 A * | 2/1976 | Pierro | ...................... | A47C 7/62 211/74 |
| 4,163,497 A * | 8/1979 | McEwen | ................. | B42F 17/12 211/11 |
| 4,475,705 A * | 10/1984 | Henneberg | ........... | A47B 21/045 248/231.81 |
| 4,619,429 A * | 10/1986 | Mazza | ................. | A47B 21/045 248/442.2 |
| 4,632,471 A * | 12/1986 | Visnapuu | ............. | A47B 21/045 248/442.2 |
| 4,869,565 A * | 9/1989 | Bachman | ................. | B41J 29/15 312/234 |
| 4,925,146 A * | 5/1990 | Hegarty | ................. | A47B 19/10 248/447 |

(Continued)

FOREIGN PATENT DOCUMENTS

| | | | | |
|---|---|---|---|---|
| DE | 29914152 U1 * | 4/2000 | ............ | G06F 1/1611 |
| DE | 10332353 B3 * | 2/2005 | ............ | G06F 1/1611 |

(Continued)

*Primary Examiner* — Kimberly T Wood
(74) *Attorney, Agent, or Firm* — Goldstein Law Offices, P.C.

(57) ABSTRACT

An adjustable frame which attaches to the bezel of a computer monitor, which comprises a first frame part and a second frame part joined in an extensible connection such that the second frame part telescopically extends or contracts in relation to the first frame part to alter the width of the adjustable frame to match the width of any computer monitor. The adjustable frame further comprises horizontal and vertical holders positioned at the top and sides of the monitor which are adapted to retain and display thin planar objects. The adjustable frame also comprises a fold-down shelf assembly adapted to display a book, and pivots between a vertical raised position and a horizontal lowered position.

13 Claims, 10 Drawing Sheets

(56) References Cited

U.S. PATENT DOCUMENTS

| | | | | |
|---|---|---|---|---|
| 4,960,257 A * | 10/1990 | Waters | B41J 29/15 248/442.2 |
| 5,035,392 A * | 7/1991 | Gross | B41J 29/15 101/484 |
| 5,074,512 A * | 12/1991 | Gianforcaro, II | B41J 29/15 248/279.1 |
| 5,082,235 A * | 1/1992 | Crowther | A47B 21/045 248/231.41 |
| 5,104,087 A * | 4/1992 | Wentzloff | A47B 21/045 248/442.2 |
| 5,125,612 A * | 6/1992 | McNeal | A47B 21/045 248/442.2 |
| 5,292,099 A * | 3/1994 | Isham | A47B 21/045 248/278.1 |
| 5,301,915 A * | 4/1994 | Bahniuk | A47B 21/045 248/442.2 |
| 5,328,145 A | 7/1994 | Charapich | |
| 5,383,642 A * | 1/1995 | Strassberg | G02B 27/024 248/442.2 |
| 5,398,905 A * | 3/1995 | Hinson | G06F 1/1607 248/442.2 |
| 5,400,993 A * | 3/1995 | Hamilton | F16M 11/10 248/279.1 |
| D367,857 S | 3/1996 | Emmerik | |
| 5,499,793 A * | 3/1996 | Salansky | A47B 81/06 160/24 |
| 5,505,421 A * | 4/1996 | Marthaler | A47B 21/045 248/442.2 |
| 5,678,792 A * | 10/1997 | Arguin | A47B 97/00 248/205.1 |
| 5,683,070 A * | 11/1997 | Seed | G06F 1/1605 248/442.2 |
| 5,786,861 A * | 7/1998 | Parker | G06F 3/0202 248/442.2 |
| 5,803,424 A * | 9/1998 | Keehn | G06F 1/1609 248/489 |
| 5,833,186 A * | 11/1998 | Kosmoski | G06F 1/1605 248/221.11 |
| 5,881,986 A * | 3/1999 | Hegarty | A47B 21/045 248/442.2 |
| 5,890,603 A * | 4/1999 | Arguin | A47B 97/00 211/45 |
| 5,927,668 A * | 7/1999 | Cyrell | A47B 81/06 248/316.1 |
| 5,931,437 A * | 8/1999 | Neuhof | B42D 17/00 248/442.2 |
| 5,947,434 A * | 9/1999 | Kosmoski | G06F 1/1605 248/221.11 |
| 5,975,478 A * | 11/1999 | Marino | A47B 21/045 211/45 |
| 5,988,582 A * | 11/1999 | Olivo | A47B 21/045 248/442.2 |
| 6,100,942 A * | 8/2000 | Hollenbaugh | G06F 1/1607 248/220.22 |
| 6,273,374 B1 * | 8/2001 | McDuffey | B42F 9/00 248/205.3 |
| 6,286,800 B1 * | 9/2001 | Junius | G06F 1/1611 248/442.2 |
| 6,290,200 B1 * | 9/2001 | Ko | A47B 21/045 248/442.2 |
| 6,443,415 B1 | 9/2002 | Sundblad | |
| 6,600,827 B2 * | 7/2003 | Lu | G06F 1/1605 248/316.4 |
| 6,686,900 B1 | 2/2004 | Levy et al. | |
| 6,721,434 B2 * | 4/2004 | Polk, Jr. | G06F 1/1605 381/307 |
| 7,028,966 B2 * | 4/2006 | Bauman | G06F 1/1601 248/442.2 |
| 7,051,463 B2 * | 5/2006 | Bing | G06F 1/1611 248/444.1 |
| 7,083,153 B1 * | 8/2006 | Delatorre | A47B 21/045 248/205.3 |
| 7,140,584 B2 * | 11/2006 | Bourque | G06F 1/1605 248/274.1 |
| 7,240,444 B1 * | 7/2007 | Rodriguez | G06F 1/1611 40/343 |
| 7,296,696 B2 * | 11/2007 | Brennan | G06F 1/1607 211/10 |
| D645,515 S * | 9/2011 | Williams, Sr. | D19/86 |
| 8,055,009 B2 * | 11/2011 | Porter | H04R 5/02 248/918 |
| D654,922 S * | 2/2012 | Nguyen | D14/449 |
| 8,136,778 B2 * | 3/2012 | Wagenhoffer, Jr. | B43K 23/001 206/586 |
| 8,284,548 B2 * | 10/2012 | Takechi | G02F 1/133308 248/323 |
| 8,672,285 B1 * | 3/2014 | Romero | A47B 21/045 248/442.2 |
| 9,351,564 B1 * | 5/2016 | Romero | A47B 21/045 |
| 2005/0145758 A1 * | 7/2005 | Chang | A47B 21/0371 248/118.1 |
| 2005/0268508 A1 * | 12/2005 | Bing | G06F 1/1611 40/658 |
| 2013/0161473 A1 * | 6/2013 | Gandiboyina | A47G 1/08 248/467 |

FOREIGN PATENT DOCUMENTS

| | | | | |
|---|---|---|---|---|
| FR | 2993680 A1 * | 1/2014 | | G06F 1/1611 |
| GB | 2410186 A * | 7/2005 | | G06F 1/1611 |
| KR | 1844548 B1 * | 4/2018 | | G06F 1/1611 |
| WO | WO-9606741 A1 * | 3/1996 | | A47B 21/045 |

* cited by examiner

ADJUSTABLE MONITOR FRAME FOR RETAINING AND DISPLAYING A BOOK AND THIN PLANAR OBJECTS

TECHNICAL FIELD

The present disclosure relates generally to an adjustable monitor frame. More particularly, the present disclosure relates to an adjustable frame which matches the width of and attaches to any computer monitor, and is capable of retaining and displaying a book and thin planar objects.

BACKGROUND

As any computer user knows, efficient use of a desk or workspace is vital for maintaining productivity. Whether the computer user is working or studying, the desk or workspace can rapidly fill up with accumulated adhesive notes, business cards, note cards, printouts, books, and other items which the computer user wishes to keep close at hand for ease of access, resulting in a disorganized, cluttered mess. Many computer users utilize the bezels or frames of their computer monitors as a surface for holding adhesive notes, but space on a bezel is limited, and cannot hold papers or books. Various types of paper holders or book stands exist, but these all occupy precious space on top of the desk or workspace.

The prior art contains several examples of bulletin boards, frames, and other devices which are designed to fit over a computer monitor. However, many of these devices lack versatility and can only be used to display papers, adhesive notes, books, or cards, but not all at once. Furthermore, these devices are rigid in form and cannot be adapted to fit a range of monitors of different sizes, nor can the computer user add or remove components to suit their requirements and adapt to their particular workspaces. Therefore, a need exists for an adjustable frame which can attach to any computer monitor, which is capable of displaying books, papers, as well a range of office and stationery items, while remaining compact and customizable.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an adjustable frame that can be attached to any computer monitor, which is capable of retaining and displaying paper, photographs, notes, cards, and other thin planar objects. Accordingly, the present disclosure provides an adjustable frame comprising a first frame part and a second frame part which attaches to the bezel of any computer monitor. The bezel surrounds the display screen, and may have a top surface, left surface, right surface, and rear surface. The first frame part and the second frame part are joined in an extensible connection which allows the second frame part to telescopically extend and contract in relation to the first frame part such that the width of the adjustable frame may be altered to match the width of any computer monitor. The adjustable frame further comprises a horizontal holder having a horizontal retaining channel adapted to retain thin planar objects. The horizontal holder is attached to the adjustable frame and positioned parallel to the top surface of the bezel of the computer monitor.

It is another aspect of an example embodiment in the present disclosure to provide an adjustable frame which further displays thin planar objects along the right and left sides of the computer monitor. Accordingly, the present disclosure provides an adjustable frame where the first frame part comprises a first frame side member which attaches to the left side of the bezel, and the second frame part comprises a second frame side member which attaches to the right side of the bezel. The adjustable frame further comprises a first vertical holder which may be attached to the first frame side member, and a second vertical holder which may be attached to the second frame side member. Both the first and second vertical holders are adapted to retain thin planar objects.

It is yet another aspect of an example embodiment in the present disclosure to provide an adjustable frame that is further capable of supporting and displaying a book, sheaf of papers, or other object too thick to be retained within the horizontal holder. Accordingly, the present disclosure provides a fold-down shelf assembly comprising a vertical shelf plate and a horizontal shelf plate, which is adapted to support and display a book. The fold-down shelf assembly can be pivotally connected to either the first frame side member or the second frame side member, and can be raised to a vertical raised position or lowered to a horizontal lowered position.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
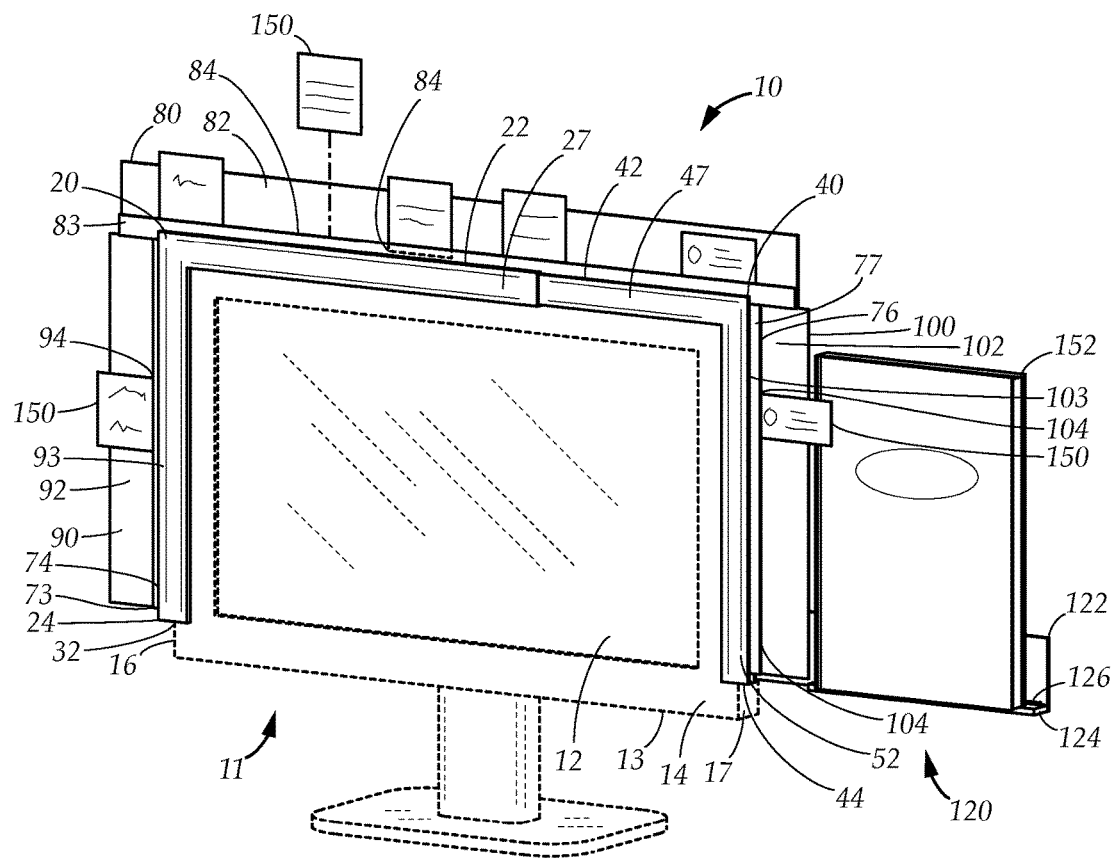
FIG. 1A is a diagrammatical front perspective view of an adjustable frame attached to the bezel of a computer monitor and equipped with holders for retaining and displaying cards and other thin planar objects, the adjustable frame further having a fold-down shelf assembly in a horizontal lowered position, in accordance with an embodiment of the present disclosure.
Figure 1B:
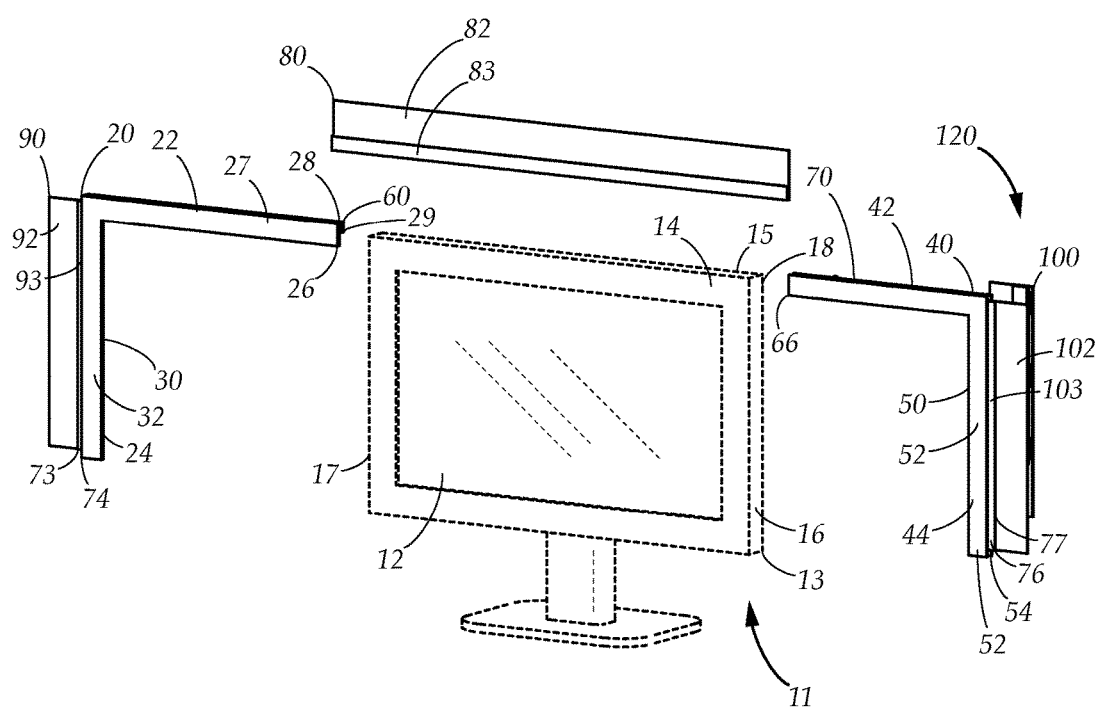
FIG. 1B is an exploded view of the adjustable frame, showing a first frame part, a second frame part, and a horizontal holder, in accordance with an embodiment of the present disclosure.
Figure 1C:
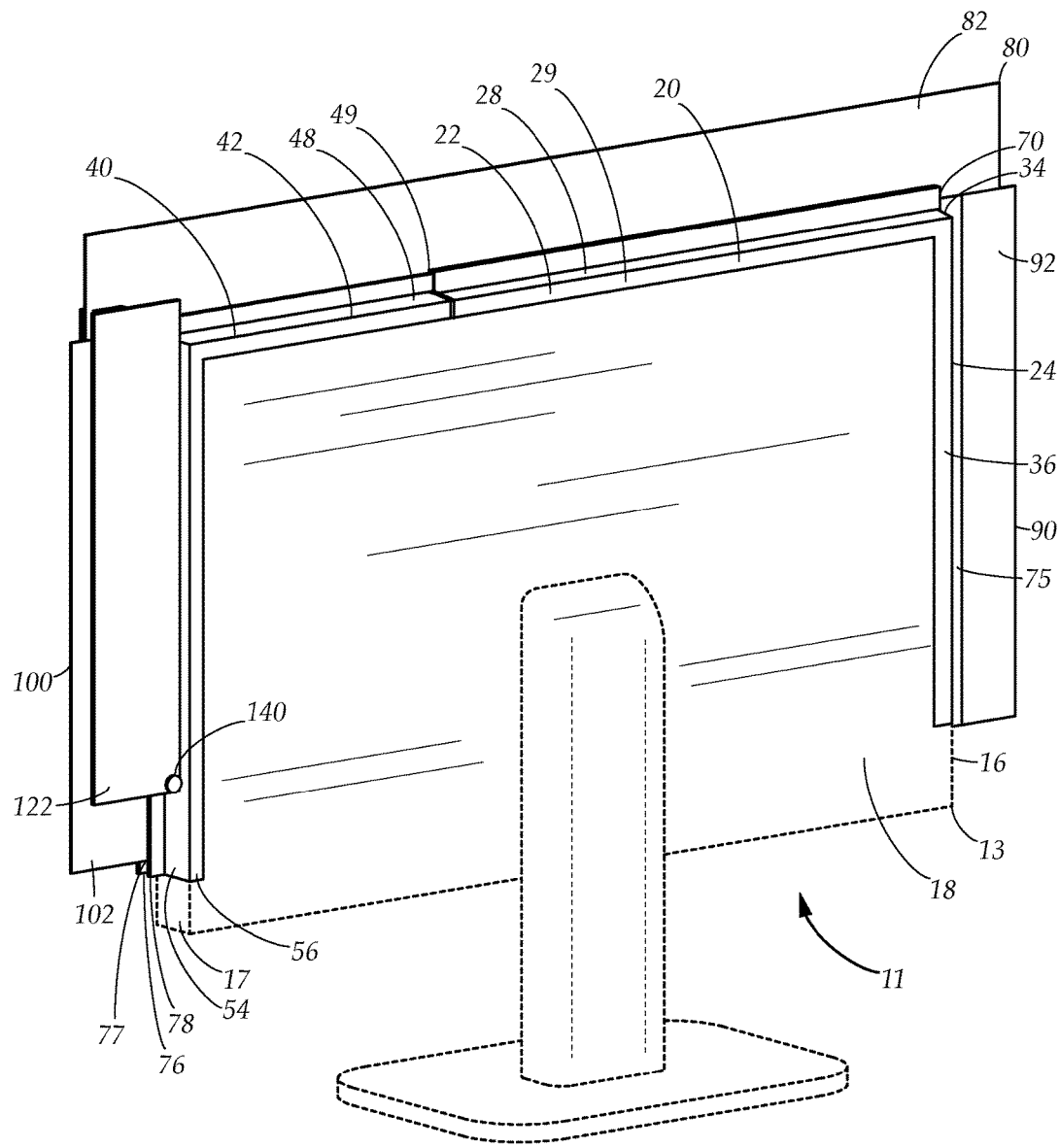
FIG. 1C is a diagrammatical rear perspective view of the adjustable frame attached to the computer monitor, showing the fold-down shelf in a vertical raised position.
Figure 2A:
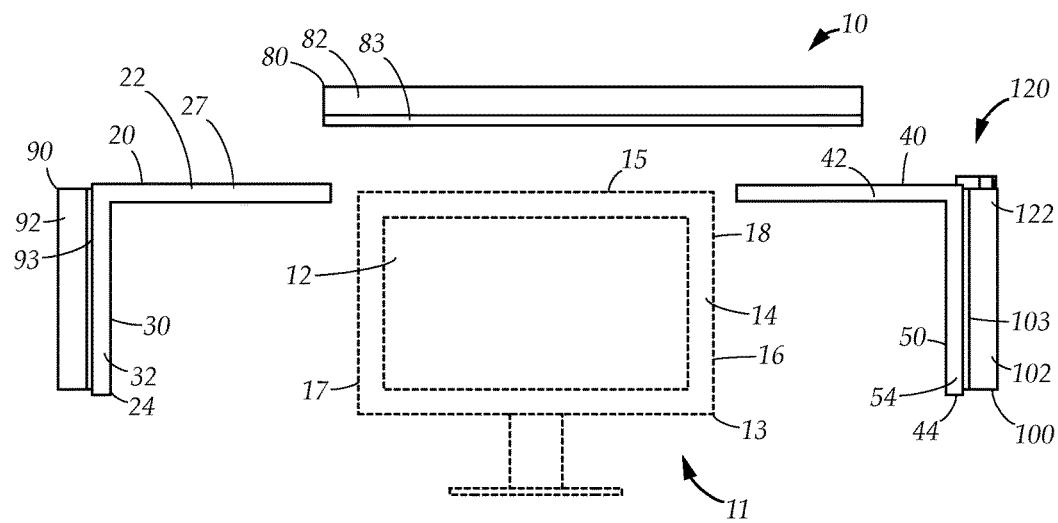
FIG. 2A is an orthogonal front view of the first frame part, second frame part, and horizontal holder in relation to the computer monitor.
Figure 2B:
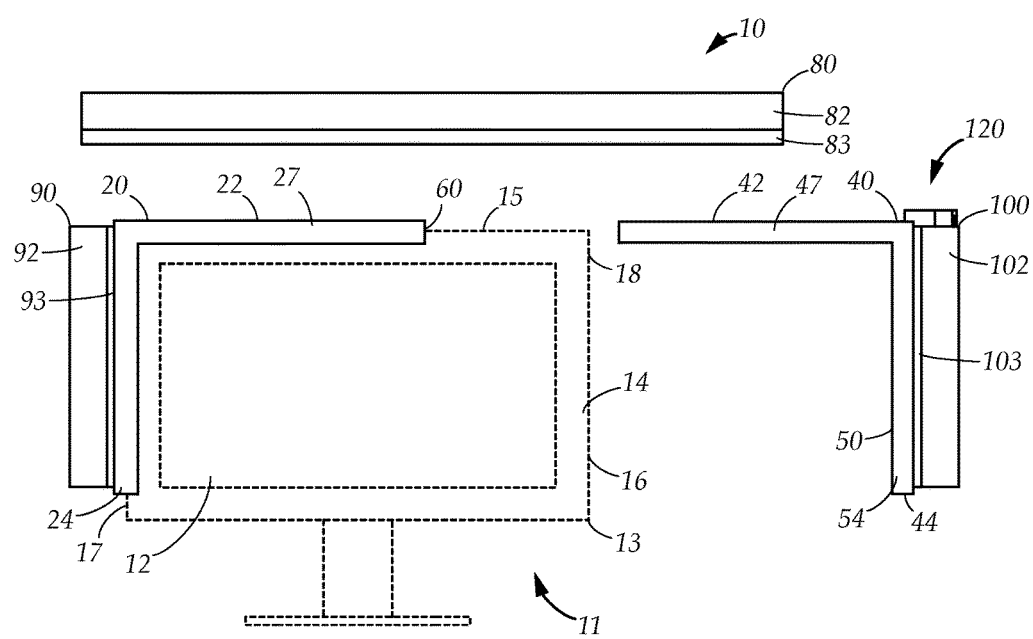
FIG. 2B is an orthogonal front view of the first frame part, second frame part, and horizontal holder, showing the first frame part attached to the bezel of the computer monitor, in accordance with an embodiment of the present disclosure.
Figure 2C:
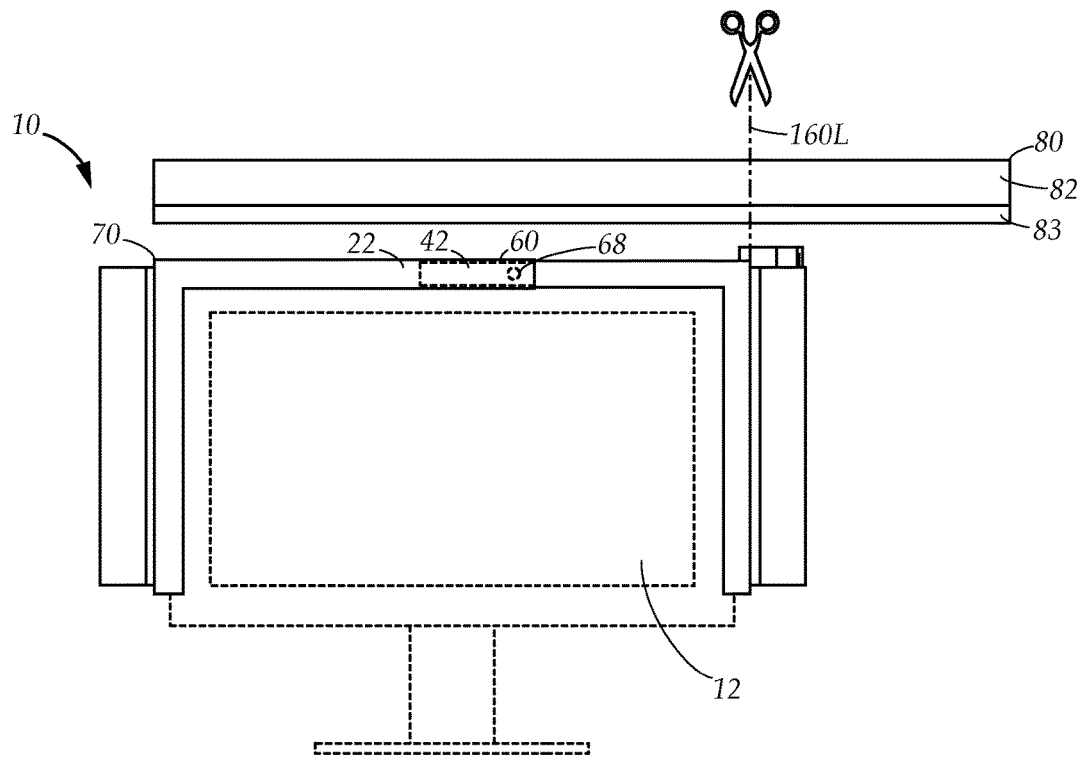
FIG. 2C is an orthogonal front view of the adjustable frame showing the second frame part joined in an extensible connection with the first frame part, with the width of the adjustable frame adapted to match the width of the bezel of the monitor, in accordance with an embodiment of the present disclosure.
Figure 2D:
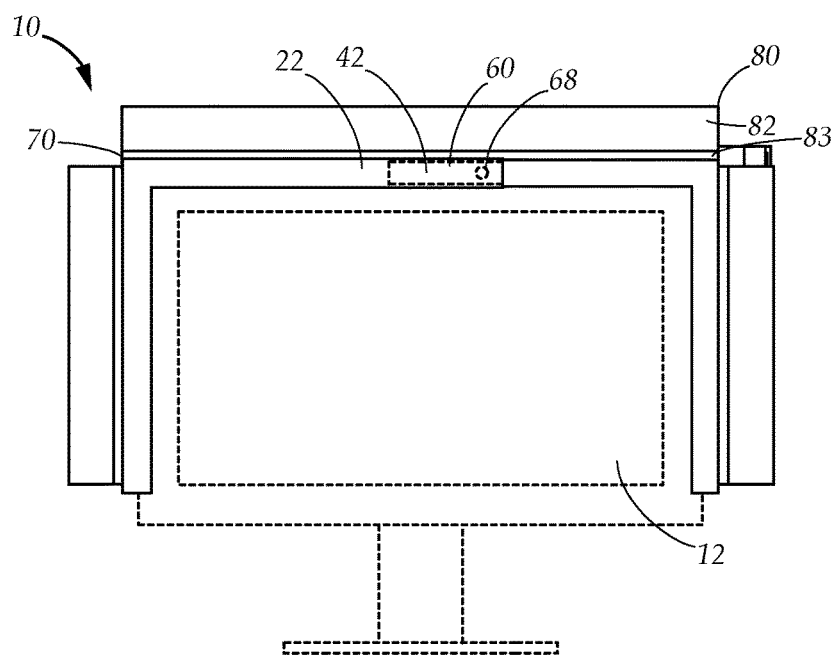
FIG. 2D is an orthogonal front view of the fully assembled adjustable frame with attached horizontal and vertical holders, in accordance with an embodiment of the present disclosure.

FIGS. 1A-C illustrate an adjustable frame 10 for retaining and displaying cards and other thin planar objects, which is attached to a computer monitor 11 having a bezel 13 surrounding a display screen 12. The bezel 13 has a front surface 14, a top surface 15, a left surface 17, a right surface 16, and a rear surface 18. The display screen 12 may be a standard LCD or LED screen, cathode ray tube, or other display type commonly used for computer monitors. In certain embodiments, the adjustable frame 10 may also be adapted to attach to a television, as a typical television is structurally similar to a large computer monitor. The adjustable frame 10 comprises a first frame part 20 and a second frame part 40. In a preferred embodiment, the first frame part 20 comprises a first frame top member 22 and a first frame side member 24 perpendicularly joined with the first frame top member 22. The second frame part 40 comprises a second frame top member 42 and a second frame side member 44 perpendicularly joined with the second frame top member 42. The adjustable frame 10 is attached to the monitor 11 such that the first and second frame top members 22, 42 contact the top surface 15 of the bezel 13, while the first and second frame side members 24, 44 contact the left and right surfaces 17, 16 of the bezel 13 respectively. The first and second frame top members 22, 42 are joined in an extensible connection in which the second frame top member 42 telescopically extends and contracts in relation to the first frame top member 22, allowing the width of the adjustable frame to be altered to match the width of the bezel 13. The first and second frame parts 20, 40 may be made of a strong but light material such as plastic, aluminum, or other suitable material.

The adjustable frame 10 further comprises a horizontal holder 80 projecting upwardly from the adjustable frame, which is adapted to retain and display a thin planar object 150 such as a card, piece of paper, photograph, or other substantially flat object or item. The horizontal holder 80 comprises a horizontal backing plate 82 and a horizontal front lip 83. The thin planar object 150 is retained within a horizontal retaining channel 84 defined by the space between the horizontal backing plate 82 and the horizontal front lip 83. The thin planar object 150 is inserted into horizontal retaining channel 84, and is held in place between the horizontal front lip 83 and the horizontal backing plate 82. The horizontal backing plate 82 may also be used as a surface for attaching adhesive notes. In a preferred embodiment, the horizontal holder 80 may be detachably connected to the adjustable frame 10. The horizontal holder 80 may be retained within a horizontal retention groove 70 disposed along the first and second frame top members 22, 42. The adjustable frame 10 may further comprise a first vertical holder 90 and a second vertical holder 100 attached to the first and second frame side members 24, 44 respectively. As with the horizontal holder 80, the first and second vertical holders 90, 100 are adapted to retain and display thin planar objects 150. The first and second vertical holders 90, 100 comprise a first vertical backing plate 92 and second vertical backing plate 102 respectively, as well as a first vertical front lip 93 and a second vertical front lip 103. The first vertical backing plate 92 and first vertical front lip 93 form a first vertical retaining channel 94, while the second vertical backing plate 102 and the second vertical front lip 103 form a second vertical retaining channel 104. In a preferred embodiment, the first and second vertical holders 90, 100 may be detachably connected to the first and second frame side members 24, 44 via a first vertical retention groove 73 and a second vertical retention groove 76 respectively.

Continuing to refer to FIGS. 1A-C, the adjustable frame 10 may further comprise a fold-down shelf assembly 120. The fold-down shelf assembly 120 may be attached to either the first or second frame side members 24, 44, and is capable of pivoting between a vertical raised position and a horizontal lowered position. In a preferred embodiment, the fold-down shelf assembly 120 is pivotally attached to the second frame side member 44 via a pivot hinge 140. The pivot hinge 140 allows the fold-down shelf assembly 120 to pivot in relation to the second frame side member 44. When the fold-down shelf assembly 120 is not in use, it can be placed in the vertical raised position to be hidden from view. The fold-down shelf assembly 120 comprises a vertical shelf plate 122 and a horizontal shelf plate 124. The horizontal shelf plate 124 is oriented perpendicularly to the vertical shelf plate 122, allowing the fold-down shelf assembly 120 to support a book 152, sheaf of papers, or other object which would be too thick to be retained within the horizontal holder 80. The horizontal shelf plate 124 may be sufficiently wide and deep to support a book 152 which is either open or closed. In some embodiments, the fold-down shelf assembly may further have one or more page holders which hold an open book in place on the fold-down shelf assembly 120. In a preferred embodiment, the vertical shelf plate 122 and the horizontal shelf plate 124 may be hingedly connected via a shelf plate hinge 126, allowing the horizontal shelf plate 124 to be raised upwards against the vertical shelf plate 122 in a vertical position. When the horizontal shelf plate 124 is in the vertical position, the fold-down shelf assembly 120 may retain thin planar objects 150 between the folded horizontal shelf plate 124 and the vertical shelf plate 122.

Turning now to FIGS. 2A-D, the extensible connection between the first and second frame parts 20, 40 allows the width of the adjustable frame 10 to be altered to match the width of the bezel 13. In a preferred embodiment, the first frame top member 22 has a main channel 60 which is sized to allow the second frame top member 42 to be received within and partially contained by the main channel 60. The second frame top member 42 may telescopically extend and contract within the main channel 60, allowing the width of the adjustable frame 10 to adapt to the width of any monitor 11, such that the first and second frame parts 20 are securely attached to the top, right, and left surfaces 15, 16, 17 of the bezel 13. For example, the size of the display screen 12 of a typical monitor, measured diagonally, may range from seventeen inches to thirty inches, with a corresponding bezel 13 width of approximately sixteen to twenty-six inches. By telescopically extending or contracting along a ten-inch range, the adjustable frame 10 can adapt to any monitor within this size range. Note that this example is non-limiting, and the adjustable frame 10 can be further adapted to fit larger and smaller monitors.

In a preferred embodiment, a grip bump 68 may be positioned on the second frame top member 42. The grip bump 68 projects from the second frame top member 42 such that it contacts the first frame top member 22 within the main channel 60. The contact between the grip bump 68 and the first frame top member 22 creates friction, holding the second frame top member 42 in position within the main channel 60 once the width of the adjustable frame 10 is adapted to the width of the bezel 13. The grip bump 68 may be made from rubber or a similar flexible, high-friction material.

Continuing to refer to FIGS. 2A-D while also referring to FIG. 1A, the width of the horizontal holder 80 is further customizable, and the horizontal holder 80 may be either wider or narrower than the width of the bezel 13 as well as the horizontal retention groove 70. In a preferred embodiment, the horizontal holder 80 may be provided with a width that allows the horizontal holder 80 to extend past the left and right surfaces 17, 16 of the bezel 13. The horizontal holder 80 may be made of thin plastic, cardboard, or other similar material, to allow the horizontal holder to be cut into holder segments, each functionally equivalent to a smaller horizontal holder. For example, the horizontal holder 80 may be cut along an exemplary cutting line 160L so that the width of the horizontal holder 80 matches the width of the bezel 30. The horizontal holder 80 may also have notches arranged at various intervals along the horizontal holder 80 which allow the horizontal holder to be snapped apart into holder segments. In certain embodiments, the widths of the first and second vertical holders 90, 100 are similarly adjustable in relation to the left and right surfaces 17, 16 of the bezel 13, by dividing the holders into holder segments via cutting or snapping. The horizontal retention groove and the first and second vertical retention grooves 70, 73, 76 can each retain any number of horizontal, first vertical, or second vertical holders 80, 90, 100 or holder segments, as appropriate, as long as the combined widths of the holders or holder segments does not exceed the width of the horizontal, first vertical, or second vertical retention grooves 70, 73, 76. In certain embodiments, the horizontal retention groove 70 and the first and second vertical retention grooves 73, 76 may further be adapted to retain accessory boards such as bulletin boards, whiteboards, and signs.

Figure 3:
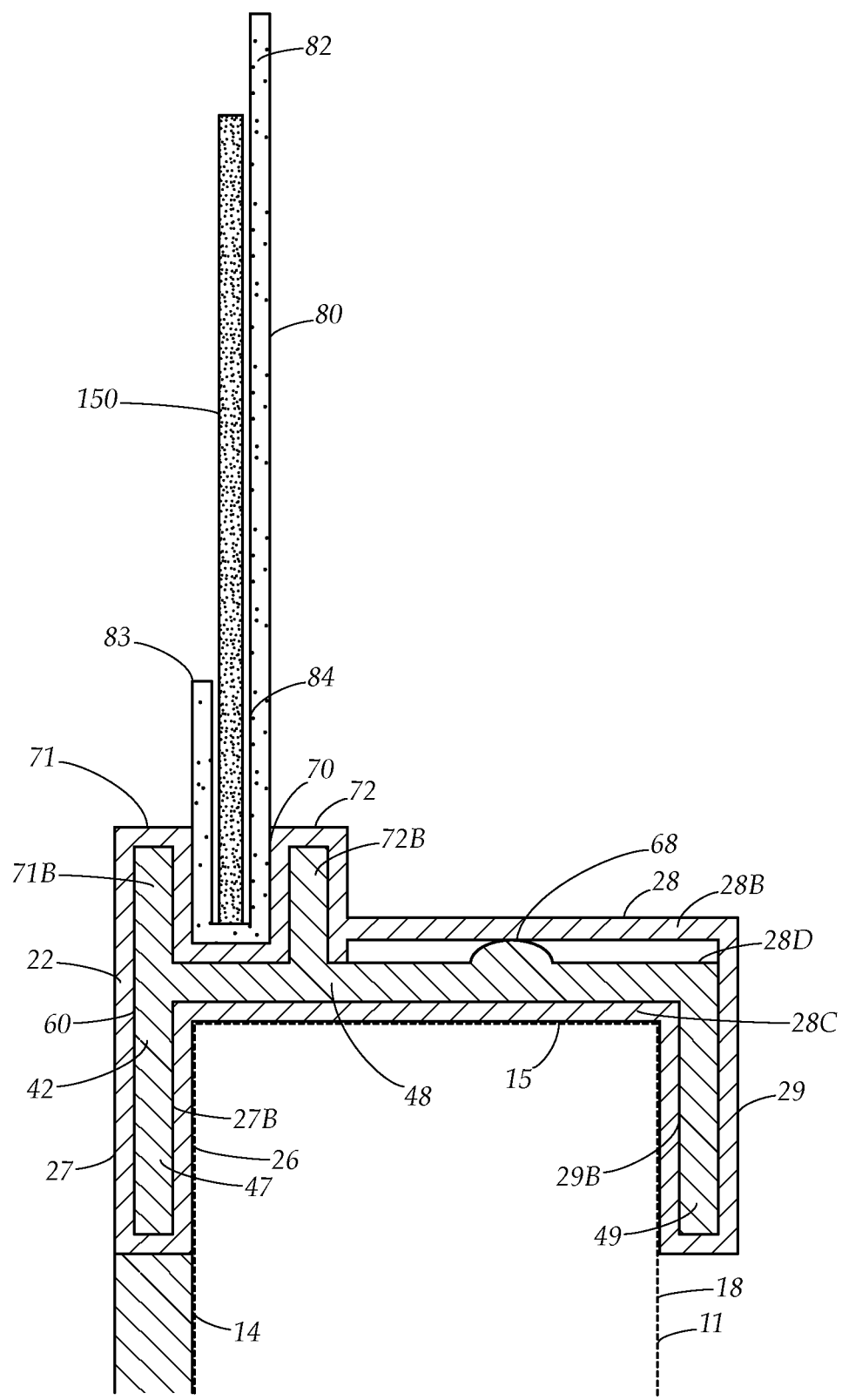
FIG. 3 is a sectional side view of the adjustable frame positioned over the bezel of the computer monitor, showing the horizontal holder, a main channel, and a horizontal monitor channel attached to the bezel, in accordance with an embodiment of the present disclosure.
Figure 4A:
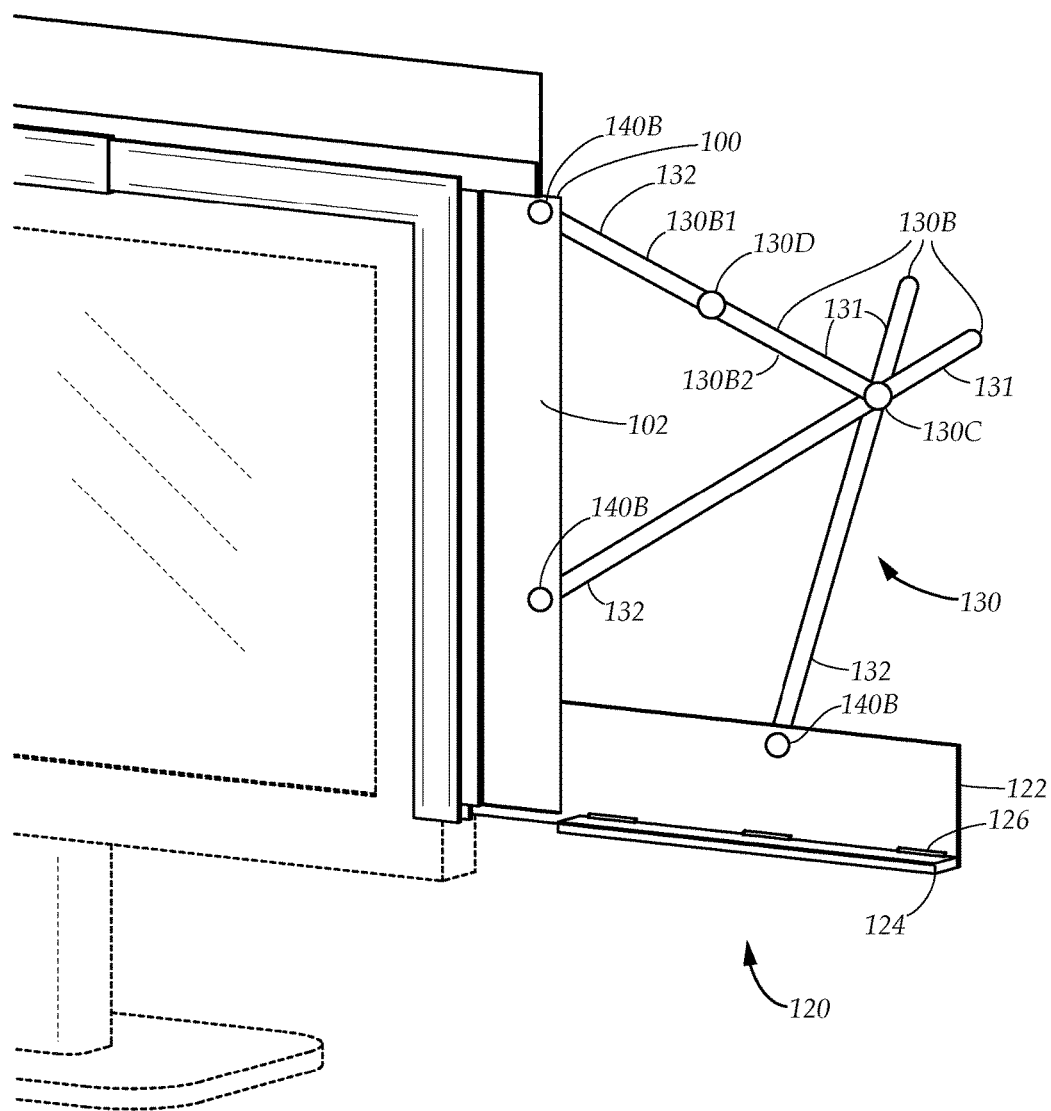
FIG. 4A is a diagrammatical front perspective view of the fold-down shelf assembly in the lowered horizontal position, further showing a vertical shelf plate hingedly connected to a horizontal shelf plate, in accordance with an embodiment of the present disclosure.
Figure 4B:
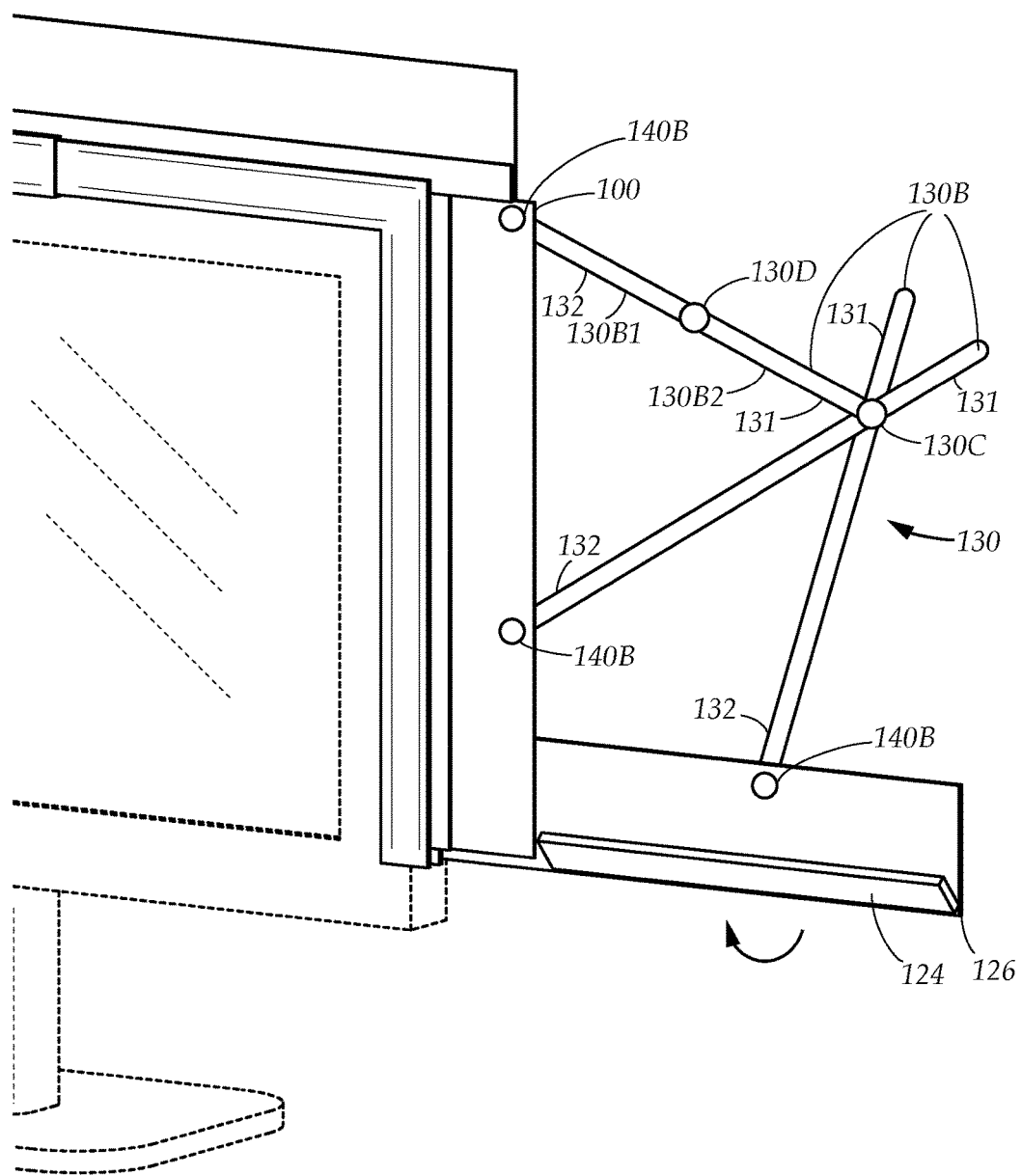
FIG. 4B is a diagrammatical front perspective view of the fold-down shelf assembly, showing the horizontal shelf plate being raised to a vertical position, in accordance with an embodiment of the present disclosure.
Figure 4C:
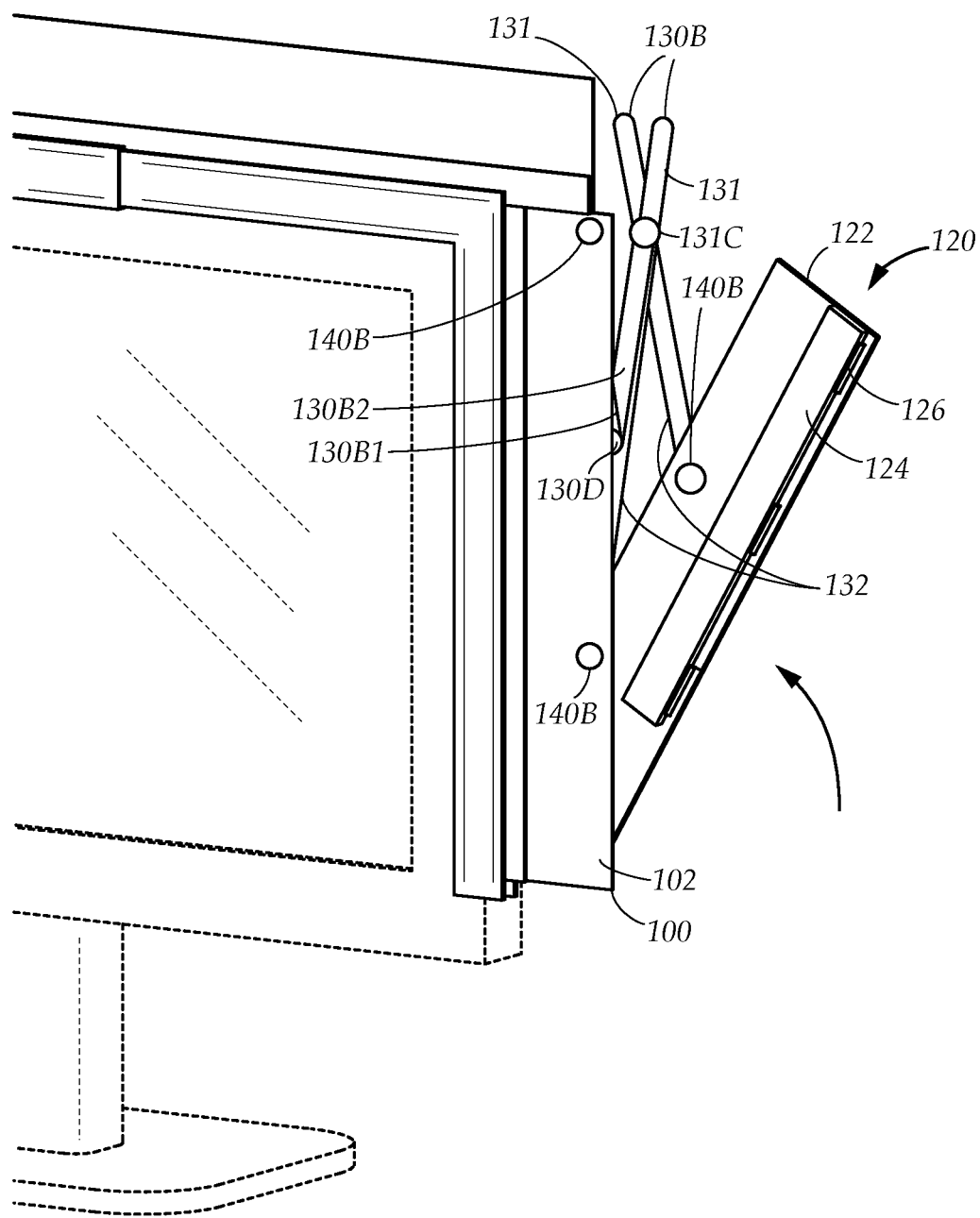
FIG. 4C is a diagrammatical front perspective view of the fold-down shelf assembly partially raised to the vertical raised position, in accordance with an embodiment of the present disclosure.
Figure 4D:
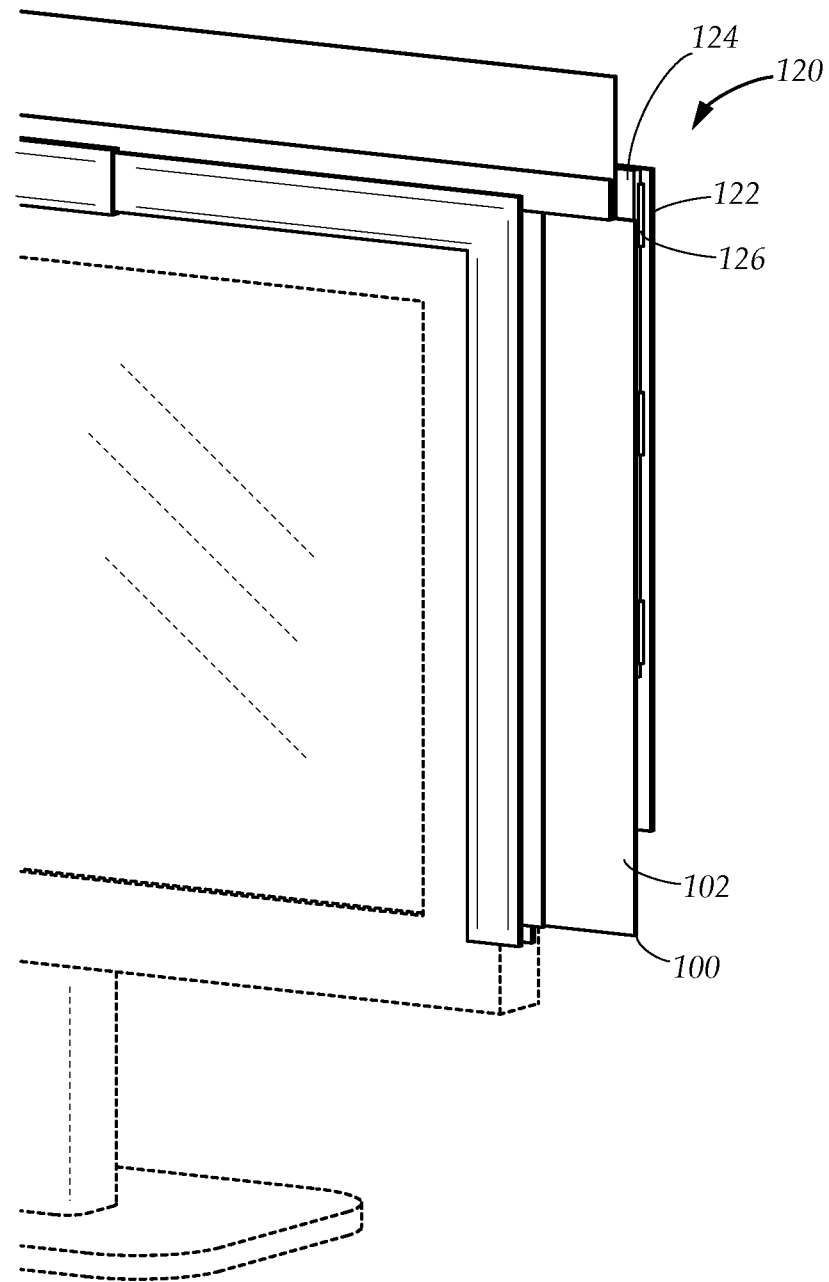
FIG. 4D is a diagrammatical front perspective view of the fold down shelf assembly fully raised to the vertical raised position, in accordance with an embodiment of the present disclosure.

Turning now to FIG. 3, while simultaneously referring to FIGS. 1A-C, the adjustable frame 10 is shown in a sectional side view that details the main channel 60 and the extensible connection between the first and second frame parts 20, 40. In a preferred embodiment, the first frame top member 22 comprises a first frame top front panel 27, a first frame top connecting panel 28, and a first frame top rear panel 29. The first frame top front, connecting, and rear panels 27, 28, 29 together define a horizontal monitor channel 26 which attaches to the bezel 13. When the adjustable frame 10 is attached to the monitor bezel 13, the first frame connecting panel 28 contacts the top surface 15 of the bezel 13, while the first frame top front panel 27 and the first frame top rear panel 29 project downwards from the first frame top connecting panel 28 to contact the front and rear surfaces 14, 18 of the bezel 13 respectively. In a preferred embodiment, portions of the first frame top member 22 may be substantially hollow. The first frame top connecting panel 28 may further comprise a top frame connecting panel upper portion 28B and a top frame connecting panel lower portion 28C, and the main channel may correspond to a connecting panel space 28D between the top frame connecting panel upper and lower portions 28B, 28C. The first frame top front and rear panels 27, 29 may also be substantially hollow and have a first frame top front panel hollow space 27B and a first frame top rear panel hollow space 29B respectively. The main channel 60 may extend from the connecting panel space 28D to include the first frame top rear and front panel hollow spaces 27B, 29B. The second frame top member 42 may comprise a second frame top connecting panel 48, and may further comprise a second frame top front panel 47, and a second frame top rear panel 49. The main channel 60 may be sized such that the second frame top member 42 fits within the main channel 60 to allow the second frame top member 42 to telescopically extend and contract within the main channel 60.

In certain embodiments, portions of the second frame top front, connecting, and rear panels 47, 48, 49 which do not form part of the extensible connection with the first frame part 20 may define a second horizontal monitor channel which attaches to the top surface 15 of the bezel 13.

The grip bump 68 may project upwards from the second frame top connecting panel 48 to contact the first frame top connecting panel 28 within the main channel 60. In certain embodiments, the first frame top connecting panel 28 may incorporate one or more grip recesses within the main channel which may catch or lock the grip bump 68 as the second frame top member 42 telescopically extends or retracts.

In certain embodiments, the first frame top member 22 does not fully enclose the second frame top member 42 at the main channel 60. The main channel 60 may lack the first frame top connecting panel lower portion 28B such that the second frame top connecting panel 48 directly contacts the top surface 15 of the bezel 13 when the adjustable frame 10 is attached to the monitor 11.

Note that the present disclosure contemplates that the configuration of the extensible connection between the first and second frame parts 20, 40 may be reversed, and the second frame top member 42 may instead be configured to form the main channel 60 within which the first frame top member 22 telescopically extends and contracts. It will be apparent to a person of ordinary skill in the art in the field of the invention to rearrange the elements of the adjustable frame 10 in light of this variation, and in accordance to the principles of the present disclosure.

Returning to FIG. 1A-C, the first frame side member 24 may comprise a first frame vertical front panel 32, a first frame vertical connecting panel 34, and a first frame vertical rear panel 36, which together define a first vertical monitor channel 30. The first vertical monitor channel 30 attaches to the bezel 13, with the first frame vertical front, connecting, and rear panels 32, 34, 36 in contact with the front, left, and rear surfaces 14, 17, 18 of the bezel 13 respectively. Similarly, the second frame side member 44 may comprise a second frame vertical front panel 52, a second frame vertical connecting panel 54, and a second frame vertical rear panel 56, which together define a second vertical monitor channel 50. The second vertical monitor channel 50 attaches to the bezel 13, with the second frame vertical front, connecting, and rear panels 52, 54, 56 in contact with the front, right, and rear surfaces 14, 16, 18 of the bezel 13 respectively.

Turning back now to FIG. 3, while simultaneously referring to FIGS. 1A-C, the horizontal holder 80 is detachably connected to the adjustable frame 10 along the horizontal retention groove 70. In a preferred embodiment, the horizontal retention groove 70 is defined by a front horizontal retention track 71 and a rear horizontal retention track 72 which project upwardly from the first frame top connecting panel 28. The front and rear horizontal retention tracks 71, 72 grip the horizontal holder 80, allowing the horizontal holder 80 to be inserted and detached. The front and rear horizontal retention tracks 71, 72 may be hollow, and the second frame top member 42 may further have a front inner retention track 71B and a rear inner retention track 72B which project upwards from the second frame top connecting panel 48 to fit within the front and rear horizontal retention tracks 71, 72 respectively. In a preferred embodiment, the first vertical retention groove 73 which retains the first vertical holder 90 may be defined by a first front vertical retention track 74 and a first rear vertical retention track 75 projecting from the first frame vertical connecting panel 34 to grip the first vertical holder 90. Similarly, the second vertical retention groove 76 which retains the second vertical holder 100 may be defined by a second front vertical retention track 77 and a second rear vertical retention track 78 projecting from the second frame vertical connecting panel 54 to grip the second vertical holder 100. Any of the horizontal and first and second vertical retention grooves 70, 73, 76 may contain friction strips made of rubber, plastic, or other similar material, which assist in retaining the thin planar object 150 through frictional contact. In certain embodiments, the first and second vertical holders 90, 100 are not detachable, and may instead project from the first and second frame vertical connecting panels 34, 54.

Turning now to FIGS. 4A-D, while simultaneously referring to FIG. 1A, the fold-down shelf assembly 120 may be attached to the adjustable frame 10 via a folding assembly 130. In a preferred embodiment, the folding mechanism 130 comprises a plurality of folding members 130B, where each folding member 130B has a pivot end 131 and a folding end 132. The pivot ends of the folding members are pivotally fastened together with a folding pivot hinge 130C. The folding end 132 of each folding member 130B is further attached to either the vertical shelf plate 122 or the second frame side member backing plate 102 via a folding hinge 140B. In a preferred embodiment, the folding ends 132 of two folding members 130B are attached to the second vertical backing plate 102, while the folding end 132 of one folding member 130B is attached to the vertical shelf plate 122. The folding assembly 130 may support the book 152 or other object in conjunction with the vertical shelf plate 122 and the horizontal shelf plate 124 when the fold-down assembly 120 is lowered to the horizontal lowered position. The folding assembly 130 pivots about the folding pivot hinge 130C as the fold-down shelf assembly is raised and lowered between the vertical raised position and the horizontal lowered position. The folding ends 132 of the folding members 130B are brought together in close proximity as the fold-down shelf assembly 120 is raised, and spread apart as the fold-down shelf assembly 120 is lowered. The fold-down shelf assembly 120 is positioned fully behind the second vertical backing plate 102 when it is raised to the vertical raised position. In some embodiments, one of the folding members 130B may collapsible. The collapsible folding member can be divided into a first segment 130B1 and a second segment 130B2 joined together by a collapsing hinge 130D. The collapsible folding member collapses and extends about the collapsing hinge 130D when the fold-down shelf assembly 120 is raised and lowered.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an adjustable monitor frame for retaining and displaying a book and thin planar objects. The disclosure is illustrated by example in the drawing figures, and throughout the written description. It should be understood that numerous variations are possible, while adhering to the inventive concept. Such variations are contemplated as being a part of the present disclosure.

What is claimed is:

1. An adjustable frame for retaining and displaying a thin planar object, for use with a computer monitor having a bezel surrounding a display screen, the bezel having a front surface, a top surface, a left surface, a right surface, and a rear surface, the bezel further having a bezel width corresponding to a distance between the left and right surfaces, the adjustable frame comprising:

a first frame part comprising a first frame top member, the first frame top member is substantially hollow and comprises a first frame top connecting panel, and a first frame top front panel and a first frame top rear panel which project downwardly from the first frame top connecting panel to define a horizontal monitor channel therebetween, the horizontal monitor channel is adapted to attach to the top surface of the bezel, the first frame top connecting panel has a connecting panel upper portion and a connecting panel lower portion which are separated by a connecting panel space, the first frame top front panel and the first frame top rear panel each have a hollow panel space, and the connecting panel space and the hollow panel spaces of the first frame top front panel and the first frame top rear panel collectively define a main channel;

a second frame part comprising a second frame top member having a second frame top connecting panel, a second frame top front panel, and a second frame top rear panel, the second frame top member is horizontally oriented, and the second frame top connecting panel, the second frame top front panel, and the second frame top rear panel define a second horizontal monitor channel adapted to attach to the top surface of the bezel;

a horizontal holder comprising a horizontal backing plate and a horizontal front lip, the horizontal backing plate and the horizontal front lip define a horizontal retaining channel adapted to retain the thin planar object, the horizontal holder is detachably connected to a horizontal retention groove formed on the first frame top member;

wherein the main channel of the first frame top member is shaped and sized to align with and receive the second frame top connecting panel, the second frame top front panel, and the second frame top rear panel of the second frame top member, the second frame part top member telescopically extends and retracts within the main channel such that the first frame part and the second frame part are joined in an extensible connection; and wherein the adjustable frame has a width which is selectively increased or decreased to match the bezel width by telescopically extending or retracting the second frame part top member within the main channel.

2. The adjustable frame as described in claim 1, wherein the first frame part further comprises a first frame side member perpendicularly joined to the first frame top member, and the second frame part further comprises a second frame side member perpendicularly joined to the second frame top member; and wherein the first frame part further comprises a first vertical monitor channel adapted to attach to the left surface of the bezel, and the second frame part further comprises a second vertical monitor channel adapted to attach to the right surface of the bezel.

3. The adjustable frame as described in claim 2, wherein the adjustable frame further comprises a first vertical holder and a second vertical holder; wherein the first vertical holder comprises a first vertical backing plate and a first vertical front lip, the first vertical backing plate and the first vertical front lip define a first vertical retaining channel adapted to retain the thin planar object; wherein the second vertical holder comprises a second vertical backing plate and a second vertical front lip, the second vertical backing plate and the second vertical front lip define a second vertical retaining channel adapted to retain the thin planar object; and wherein the first vertical holder is detachably connected to a first vertical retention groove formed on the first frame side member, and the second vertical holder is detachably connected to a second vertical retention groove formed on the second frame side member.

4. The adjustable frame as described in claim 3, wherein the adjustable frame further comprises a fold-down shelf assembly, the fold-down assembly is adapted to support a book, the fold-down shelf assembly is hingedly connected to the second frame side member and pivots between a vertical raised position and a horizontal lowered position, the fold-down shelf assembly comprising a vertical shelf plate and a horizontal shelf plate perpendicularly attached to the vertical shelf plate.

5. The adjustable frame as described in claim 4, wherein the horizontal shelf plate is connected to the vertical shelf plate via a shelf plate hinge, and the horizontal shelf plate hingedly lowers and elevates between a vertical position and a horizontal position.

6. The adjustable frame as described in claim 5, wherein the fold-down shelf assembly is positioned behind the second vertical holder when pivoted to the vertical raised position.

7. The adjustable frame as described in claim 6, wherein the second frame top connecting panel further comprises a grip bump, and the grip bump projects from the second frame top connecting panel to form a frictional contact with the first frame top connecting panel to maintain the second frame top member in a locked position within the main channel.

8. An adjustable frame for retaining and displaying a thin planar object and a book, for use with a computer monitor having a bezel surrounding a display screen, the bezel having a front surface, a top surface, a left surface, a right surface, and a rear surface, the bezel further having a bezel width corresponding to a distance between the left and right surfaces, the adjustable frame comprising:

a first frame part comprising a first frame top member and a first frame side member, the first frame top member is horizontally oriented and the first frame side member is perpendicularly joined to the first frame top member, the first frame top member is substantially hollow and comprises a first frame top connecting panel, and a first frame top front panel and a first frame top rear panel which project downwardly from the first frame top connecting panel to define a horizontal monitor channel therebetween, the horizontal monitor channel is adapted to attach to the top surface of the bezel, and the first frame side member comprises a first vertical monitor channel to the left surface of the bezel, the first frame top connecting panel has a connecting panel upper portion and a connecting panel lower portion which are separated by a connecting panel space, the first frame top front panel and the first frame top rear panel each have a hollow panel space, and the connecting panel space and the hollow panel spaces of the first frame top front panel and the first frame top rear panel collectively define a main channel;

a second frame part comprising a second frame top member and a second frame side member, the second frame top member having a second frame top connecting panel, a second frame top front panel, and a second frame top rear panel, the second frame top member is horizontally oriented and the second frame side member is perpendicularly joined to the second frame top member, the second frame side member comprises a second vertical monitor channel adapted to attach to the right surface of the bezel;

a horizontal holder comprising a horizontal backing plate and a horizontal front lip, the horizontal backing plate and the horizontal front lip define a horizontal retaining channel adapted to retain the thin planar object, the horizontal holder is detachably connected to a horizontal retention groove formed on the first frame top member;

a fold-down shelf assembly adapted to support the book, the fold-down shelf assembly is hingedly connected to the second frame side member and pivots between a vertical raised position and a horizontal lowered position, the fold-down shelf assembly comprises a vertical shelf plate and a horizontal shelf plate perpendicularly attached to the vertical shelf plate;

wherein the main channel of the first frame top member is sized and shaped to align with and receive the second frame top connecting panel, the second frame top front panel, and the second frame top rear panel of the second frame top member, the second frame part top member telescopically extends and retracts within the main channel such that the first frame part and the second frame part are joined in an extensible connection; and wherein the adjustable frame has a width which is selectively increased or decreased to match the bezel width by telescopically extending or retracting the second frame part top member within the main channel.

9. The adjustable frame as described in claim 8, wherein the adjustable frame further comprises a first vertical holder and a second vertical holder, the first vertical holder comprises a first vertical backing plate and a first vertical front lip, the first vertical backing plate and first vertical front lip define a first vertical retaining channel adapted to retain the thin planar object, the second vertical holder comprises a second vertical backing plate and a second vertical front lip, the second vertical backing plate and second vertical front lip define a second vertical retaining channel adapted to retain the thin planar object; wherein the first vertical holder is detachably connected to a first vertical retention groove formed on the first frame side member, and the second vertical holder is detachably connected to a second vertical retention groove formed on the second frame side member.

10. The adjustable frame as described in claim 9, wherein the fold-down shelf assembly further comprises a folding assembly, the folding assembly comprising a plurality of folding members each having a pivot end and a folding end, wherein the folding end of at least one folding member within the plurality of folding members is hingedly connected to the second vertical backing plate, the folding end of at least one folding member within the plurality of folding members is hingedly connected to the vertical shelf plate, and the pivot ends of the plurality of folding members are connected together by a folding pivot hinge, and wherein the folding assembly pivots about the folding pivot hinge such that the folding ends of the folding members are brought together in close proximity when the fold-down shelf assembly is in the vertical raised position, and spread apart when the fold-down shelf assembly is in the horizontal lowered position.

11. The adjustable frame as described in claim 10, wherein the horizontal shelf plate is connected to the vertical shelf plate via a shelf plate hinge, and the horizontal shelf plate hingedly lowers and elevates between a vertical position and a horizontal position.

12. The adjustable frame of claim 11, wherein the fold-down shelf assembly is positioned behind the second vertical holder when pivoted to the vertical raised position.

13. The adjustable frame of claim 12, wherein the second frame top connecting panel further comprises a grip bump, and the grip bump projects from the second frame top connecting panel to form a frictional contact with the first frame top connecting panel to maintain the second frame top member in a locked position within the main channel.

* * * * *